US011715086B2

(12) United States Patent
Zou et al.

(10) Patent No.: US 11,715,086 B2
(45) Date of Patent: *Aug. 1, 2023

(54) DATA INTERACTION METHOD, VERIFICATION TERMINAL, SERVER, AND SYSTEM

(71) Applicant: TENCENT TECHNOLOGY (SHENZHEN) COMPANY LIMITED, Shenzhen (CN)

(72) Inventors: Fengfu Zou, Shenzhen (CN); Weigang Peng, Shenzhen (CN); Xinghua Zhuang, Shenzhen (CN); Qiyun Cai, Shenzhen (CN); Zhuren Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 22 days.

This patent is subject to a terminal disclaimer.

(21) Appl. No.: 17/229,566

(22) Filed: Apr. 13, 2021

(65) Prior Publication Data

US 2021/0233056 A1 Jul. 29, 2021

Related U.S. Application Data

(63) Continuation of application No. 15/190,839, filed on Jun. 23, 2016, now Pat. No. 11,017,372, which is a (Continued)

(30) Foreign Application Priority Data

Feb. 12, 2014 (CN) .......................... 201410049288.1

(51) Int. Cl.
*G06Q 20/32* (2012.01)
*G06Q 20/40* (2012.01)
(Continued)

(52) U.S. Cl.
CPC ....... *G06Q 20/322* (2013.01); *G06Q 20/4014* (2013.01); *H04L 63/0281* (2013.01);
(Continued)

(58) Field of Classification Search
CPC .............. G06Q 20/322; G06Q 20/4014; H04L 63/0281; H04L 63/083; H04L 63/0846;
(Continued)

(56) References Cited

U.S. PATENT DOCUMENTS 5,457,737 A * 10/1995 Wen ...................... H04L 63/083
455/410
8,094,812 B1 * 1/2012 Tsang ..................... H04L 63/126
713/184

(Continued)

FOREIGN PATENT DOCUMENTS

CN 101710407 A 5/2010
CN 102208070 A 10/2011
(Continued)

OTHER PUBLICATIONS

"Smartphones as Practical and Secure Location Verification Tokens for Payments", claudio Marforio, Nikolaos Karapanos, Claudio Soriente, Kari Kostiainen and Srdjan Capkun, Institute of Information Security ETH Zurich, ResearchGate Jan. 2014 (Year: 2014).

(Continued)

*Primary Examiner* — Christopher Bridges
*Assistant Examiner* — Tony P Kanaan
(74) *Attorney, Agent, or Firm* — Anova Law Group, PLLC (57) ABSTRACT

A data interaction method, a verification terminal, a server, and a system are described. The method includes: receiving, by a verification terminal, identity verification information from a user terminal, the identity verification information being information sent to the user terminal by a server in
(Continued)

advance; sending, by the verification terminal, a request instruction to the server, the request instruction including the identity verification information; executing, by the server, an operation corresponding to the request instruction; and sending, by the server, feedback information to the verification terminal.

17 Claims, 4 Drawing Sheets

Related U.S. Application Data continuation of application No. PCT/CN2015/072693, filed on Feb. 10, 2015.

(51) Int. Cl.
*H04W 4/14* (2009.01)
*H04L 9/40* (2022.01)

(52) U.S. Cl.
CPC ........ *H04L 63/083* (2013.01); *H04L 63/0846* (2013.01); *H04L 2463/102* (2013.01); *H04W 4/14* (2013.01)

(58) Field of Classification Search
CPC ........... H04L 2463/102; H04L 63/0876; H04L 63/126; H04W 4/14
See application file for complete search history.

(56) References Cited

U.S. PATENT DOCUMENTS

| | | | |
|---|---|---|---|
| 8,127,982 B1* | 3/2012 | Casey | G06Q 40/02 235/382.5 |
| 8,706,557 B1* | 4/2014 | Tavares | G06Q 20/204 705/16 |
| 9,203,860 B1* | 12/2015 | Casillas | H04L 63/1408 |
| 9,248,369 B2* | 2/2016 | Fotevski | A63F 3/08 |
| 9,325,696 B1* | 4/2016 | Balfanz | H04L 63/0815 |
| 9,531,696 B2* | 12/2016 | Weiss | H04W 12/068 |
| 9,595,036 B2* | 3/2017 | Kingston | G06Q 20/405 |
| 9,767,457 B1* | 9/2017 | Ford | G06Q 20/202 |
| 9,807,086 B2 | 10/2017 | Nordstrom et al. | |
| 9,996,825 B1* | 6/2018 | Casey | G06Q 20/108 |
| 10,423,949 B2* | 9/2019 | Lyons | G06Q 20/40 |
| 10,726,668 B2* | 7/2020 | Nelson | G07F 17/3206 |
| 11,017,372 B2* | 5/2021 | Zou | G06Q 20/322 |
| 2005/0165684 A1 | 7/2005 | Jensen et al. | |
| 2006/0015938 A1* | 1/2006 | Wlodarczyk | G07F 7/1083 726/22 |
| 2006/0212407 A1* | 9/2006 | Lyon | G06Q 20/4014 705/71 |
| 2006/0242241 A1* | 10/2006 | Tock | H04L 63/083 709/206 |
| 2008/0217399 A1 | 9/2008 | Leblanc | |
| 2008/0295150 A1* | 11/2008 | Yankovich | G06Q 10/06 726/2 |
| 2010/0312636 A1* | 12/2010 | Coulter | G06Q 30/0238 705/44 |
| 2011/0047075 A1* | 2/2011 | Fourez | G06Q 20/40 705/44 |
| 2012/0203580 A1* | 8/2012 | Smith | G06Q 40/02 705/305 |
| 2012/0264405 A1* | 10/2012 | Bravo | G06Q 20/385 379/91.01 |
| 2013/0159186 A1* | 6/2013 | Brudnicki | G06Q 20/3224 705/44 |
| 2013/0304516 A1* | 11/2013 | Schimelman | G06Q 40/08 705/30 |
| 2014/0108263 A1* | 4/2014 | Ortiz | G06Q 20/36 705/44 |
| 2014/0114780 A1* | 4/2014 | Menefee | G06Q 20/20 705/21 |
| 2014/0279111 A1* | 9/2014 | Mahaffey | H04L 67/1097 705/21 |
| 2014/0279556 A1* | 9/2014 | Priebatsch | G06Q 20/38215 705/67 |
| 2014/0379504 A1* | 12/2014 | George | G06Q 20/3224 705/21 |
| 2015/0082403 A1* | 3/2015 | Yang | H04L 63/083 726/7 |
| 2015/0088729 A1* | 3/2015 | Langere | G06Q 30/0645 705/39 |
| 2015/0134518 A1* | 5/2015 | Turovsky | G06Q 20/12 705/41 |
| 2015/0135274 A1* | 5/2015 | Huang | H04W 4/023 726/4 |
| 2015/0154599 A1* | 6/2015 | Lyda | G06Q 40/00 705/44 |
| 2015/0186869 A1* | 7/2015 | Winters | G06Q 50/28 705/26.81 |
| 2015/0213443 A1* | 7/2015 | Geffon | G06Q 20/3821 705/76 |
| 2015/0227928 A1* | 8/2015 | Patel | G06Q 20/322 705/44 |
| 2015/0269582 A1* | 9/2015 | Simmons | G06Q 20/42 705/44 |
| 2015/0371212 A1* | 12/2015 | Giordano | H04W 12/062 705/44 |
| 2016/0055549 A1* | 2/2016 | Martell | H04L 12/1453 455/406 |
| 2016/0099941 A1* | 4/2016 | Hein | H04L 63/0876 726/4 |
| 2017/0124551 A1* | 5/2017 | Chitalia | G06Q 20/202 |
| 2020/0021582 A1* | 1/2020 | Brown | G06F 16/9535 |

FOREIGN PATENT DOCUMENTS

| | | |
|---|---|---|
| CN | 102243739 A | 11/2011 |
| CN | 103020818 A | 4/2013 |
| CN | 103533392 A | 1/2014 |
| WO | 2013182093 A1 | 12/2013 |

OTHER PUBLICATIONS

International Search Report in International Application No. PCT/CN2015/072693, dated Apr. 29, 2015.
English Translation of the Written Opinion of the International Search Authority in International application No. PCT/CN2015/072693, dated Apr. 29, 2015.
Wang, "Design of Intelligent Campus System Based on Internet of Things Technology,"Wireless Internet Technology, vol. No. 1, Jan. 31, 2014 (Jan. 31, 2014), Section 3.3.
Notification of the First Office Action of Chinese application No. 201410049288.1, dated Apr. 6, 2016.

* cited by examiner

DATA INTERACTION METHOD, VERIFICATION TERMINAL, SERVER, AND SYSTEM

CROSS REFERENCE TO RELATED APPLICATIONS

This application is a continuation application of U.S. patent application Ser. No. 15/190,839, filed on Jun. 23, 2016, which in turn is a continuation application of International Patent Application No.: PCT/CN2015/072693, filed on Feb. 10, 2015, which in turn claims priority to Chinese Patent Application No.: 201410049288.1, filed on Feb. 12, 2014, all of which are incorporated by reference herein in their entirety.

FIELD OF THE TECHNOLOGY

The present disclosure relates to the field of computer technologies, and in particular, to a data interaction method, a verification terminal, a server, and a system.

BACKGROUND OF THE DISCLOSURE

In the existing technology, a payment manner based on the mobile Internet is mainly implemented by means of data interaction processing between a mobile terminal and a payment server, and currently there are mainly the following two processing manners:

In the first manner, a payment server cooperates with a merchant terminal. The merchant terminal installs, on a vending machine or a computer, an identification code generating program identifiable to the payment server; during consumption of a common user, the vending machine or the merchant terminal generates an identification code (such as serial numbers, a bar code, or a two-dimensional code picture) for this consumption behavior; the user uses a mobile terminal to identify the identification code, and then inputs a payment password; and after the payment server successfully verifies the password, the merchant terminal or the vending machine delivers goods, thereby finally completing this consumption and purchase process. By using a vending machine, a mobile terminal having a payment function, and a payment server as examples, a specific process is as follows:

1. The vending machine receives a selection instruction input by a user, where the selection instruction is used to determine an item that the user needs to purchase;

2. The vending machine displays, on a display screen, a two-dimensional code of the purchased item;

3. The user scans the two-dimensional code by using a scan function of the mobile terminal, and then a payment password input box pops up on the mobile terminal;

4. The payment server receives a payment password input by the user, and after the verification succeeds, instructs the vending machine to sell the selected and purchased item;

5. The vending machine confirms completion of this consumption process after the user takes away the purchased item.

In this data interaction processing manner, during identification of the identification code by the mobile terminal, the mobile terminal needs to receive serial numbers or scan a bar code (or a two-dimensional code picture), which consumes a relatively long time. Moreover, a payment password needs to be input for each consumption, so that it takes a longer time to complete the payment process; therefore, this manner is completely incompetent in some scenarios requiring quick payment (for example, ticket purchasing in a subway station).

In the second manner, for a payment solution of an Online 2 Offline (O2O) website such as a group buying website, the group buying website signs a cooperation agreement with a merchant terminal; when a user performs selection on the group buying website and pays for a purchased item, the group buying website generates an SMS verification code or a two-dimensional code picture for this consumption; when the user performs consumption settlement at the merchant terminal, the user shows the SMS verification code or the two-dimensional code; and after the merchant terminal successfully verifies the code, this consumption process is completed.

By using the foregoing data interaction manner, when the user selects and purchases an item online, the user needs to complete online payment before the user experiences the item. Although a payment time is short, an offline transaction is completed only after the user receives the purchased item or goes to a store providing the purchased item to perform consumption, which makes the entire process consume a longer time.

No effective solution is proposed for the problem that the data interaction manners in the existing technology consume a relatively long time.

SUMMARY

An embodiment of the present disclosure is to provide a data interaction method, a verification terminal, a server, and a system, so as to solve the problem that the data interaction manners in the existing technology consume a relatively long time.

According to one aspect of an embodiment of the present invention, a data interaction method is provided, including: receiving, by a verification terminal, identity verification information from a user terminal, the identity verification information being information sent to the user terminal by a server in advance; sending, by the verification terminal, a request instruction to the server, the request instruction including the identity verification information; executing, by the server, an operation corresponding to the request instruction; and sending, by the server, feedback information to the verification terminal.

According to another aspect of an embodiment of the present invention, a data interaction method is provided, including: receiving, by a verification terminal, identity verification information from a user terminal, the identity verification information being information sent to the user terminal by a server in advance; sending, by the verification terminal, a request instruction to the server, the request instruction including the identity verification information; and receiving, by the verification terminal, feedback information from the server, the feedback information being information sent by the server to the verification terminal after executing an operation corresponding to the request instruction.

According to another aspect of an embodiment of the present invention, a data interaction method is provided, including: receiving, by a server, a request instruction from a verification terminal, the request instruction including identity verification information received from a user terminal by the verification terminal, the identity verification information being information sent to the user terminal by the server in advance; executing, by the server, an operation corresponding to the request instruction; and sending, by the server, feedback information to the verification terminal.

According to another aspect of an embodiment of the present invention, a verification terminal is provided, including: a first receiving unit, configured to receive identity verification information from a user terminal, the identity verification information being information sent to the user terminal by a server in advance; a sending unit, configured to send a request instruction to the server, the request instruction including the identity verification information; and a second receiving unit, configured to receive feedback information from the server, the feedback information being information sent by the server to the verification terminal after executing an operation corresponding to the request instruction.

According to another aspect of an embodiment of the present invention, a server is provided, including: a first receiving unit, configured to receive a request instruction from a verification terminal, the request instruction including identity verification information received from a user terminal by the verification terminal, and the identity verification information being information sent to the user terminal by the server in advance; an executing unit, configured to execute an operation corresponding to the request instruction; and a first sending unit, configured to send feedback information to the verification terminal.

According to another aspect of an embodiment of the present invention, a data interaction system is provided, including a verification terminal and a server, the verification terminal being configured to receive identity verification information from a user terminal, send a request instruction to the server, and receive feedback information from the server, the identity verification information being information sent to the user terminal by the server in advance, and the request instruction including the identity verification information; and the server being configured to receive the request instruction, execute an operation corresponding to the request instruction, and send the feedback information to the verification terminal.

Compared with the manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, the embodiments of the present invention solve the problem that the data interaction manners in the existing technology consume a relatively long time, thereby achieving effects of shortening the time and improving efficiency.

BRIEF DESCRIPTION OF THE DRAWINGS

The accompanying drawings constituting a part of this application are used to provide a further understanding of the present disclosure, and the exemplary embodiments of the present invention and descriptions thereof are used to explain the present disclosure, but are not construed as an inappropriate limitation to the present disclosure. In the accompanying drawings.

DESCRIPTION OF EMBODIMENTS

To make a person skilled in the art better understand the solutions of the present disclosure, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

It should be noted that, terms such as "first" and "second" in the specification, claims and the foregoing accompanying drawings of the present disclosure are used to distinguish similar objects, but are not necessarily used to describe a specific sequence or order. It should be understood that, the terms used in this manner can be interchanged if appropriate, so that the embodiments of the present invention described herein can be implemented in other sequences than those shown or described herein. In addition, the terms "include" and "have" and any other variations thereof are intended to cover nonexclusive inclusions, for example, a process, a method, a system, a product or a device that includes a series of steps or units is not necessarily limited to including those explicitly listed steps or units, but may include other steps or units that are not explicitly listed, or inherent to the process, method, product, or device.

Figure 1:
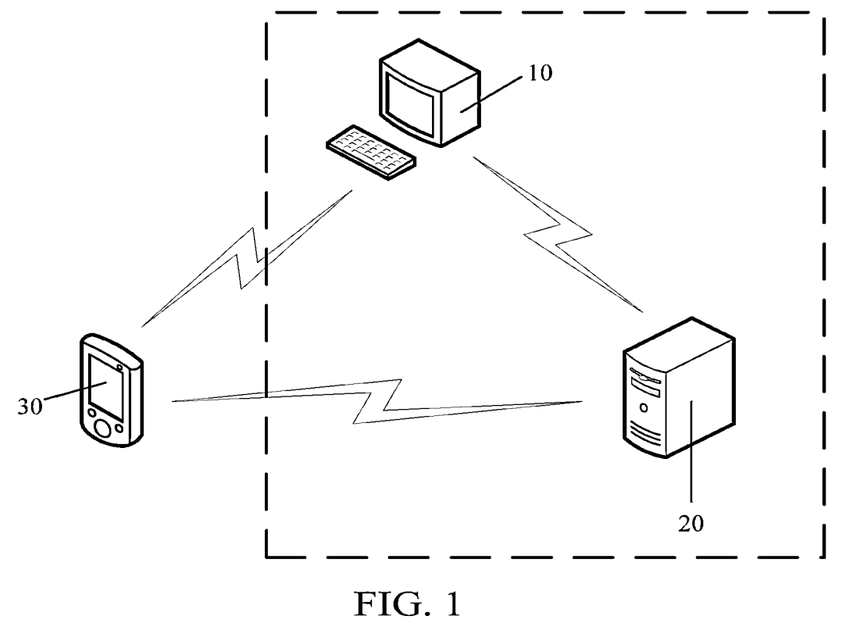
FIG. 1 is a schematic diagram of a data interaction system according to an embodiment of the present invention.

According to this embodiment of the present invention, a system embodiment that can be used to implement an apparatus embodiment of the present invention is provided, and the system embodiment can also be used to execute a method embodiment of the present invention. The system embodiment provided by this embodiment of the present invention is specifically described as follows:

FIG. 1 is a schematic diagram of a data interaction system according to an embodiment of the present invention. As shown in FIG. 1, the data interaction system mainly includes a verification terminal 10 and a server 20.

The verification terminal 10 is configured to receive identity verification information from a user terminal 30, send a request instruction to the server 20, and receive feedback information from the server 20, where the identity verification information is information sent to the user terminal 30 by the server 20 in advance, and the request instruction includes the identity verification information. The server 20 is configured to receive the request instruction, execute an operation corresponding to the request instruction, and send the feedback information to the verification terminal 10.

In the data interaction system of this embodiment of the present invention, a verification terminal receives identity verification information from a user terminal, and sends a request instruction including the received identity verification information to a server; and then the server executes a corresponding operation, and sends feedback information to the verification terminal, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction manners in the existing technology consume a relatively long time, thereby achieving effects of shortening the time and improving efficiency.

Specifically, by using an example in which the user terminal 30 performs a consumption transaction by using an e-commerce platform, the principle of the foregoing embodiment is further specifically described in detail as follows:

Before a consumption, the user terminal 30 interacts with the server 20 to set corresponding setting information on an e-commerce platform run by the server 20. Optionally, the setting information in this embodiment may include, but is not limited to, a preset value (such as 100 yuan) used to represent a maximum payment amount, and a period of validity of the maximum payment amount, where the period of validity may be indicated by a setting duration and a preset duration (such as 12 hours). After the setting information is received and the verification of a payment password input by the user terminal 30 succeeds, the server 20 generates, on an interface of the e-commerce platform, identity verification information corresponding to the setting information by using the setting information from the user terminal 30. In this embodiment, the identity verification information may be displayed in the form of a two-dimensional code, a bar code, a string, or the like, and the user terminal 30 may be a portable device such as a smart phone or a tablet computer. The verification terminal 10 may be a device such as a two-dimensional code scanner, a bar code scanner, or a string receiver, the verification terminal 10 may communicate with the server 20 in a wired and or wireless manner, the user terminal 30 may communicate with the server 20 by using a mobile network or the Internet, and the user terminal 30 may communicate with the verification terminal 10 by using a manner such as a near field communication manner or a scan manner.

A consumption transaction scenario is described below with reference to the foregoing setting information and identity verification information, but it should be noted that, the following scenario is merely an example, which is not limited in this embodiment.

In a first scenario, a consumption transaction is performed on a vending machine on which the verification terminal 10 is installed. During an actual consumption transaction, after selecting an item, a consumer displays identity verification information saved in the user terminal 30 to a verification information scan area of the verification terminal 10, so that the verification terminal 10 reads the identity verification information; after reading the identity verification information, the verification terminal 10 sends a request instruction including the identity verification information and an actual consumption amount to the server 20 to verify a consumption deduction; the server 20 verifies validity of information such as the identity verification information; and if the verification succeeds, the server 20 executes an operation corresponding to the request instruction, and sends feedback information to the verification terminal 10 after the operation is completed. The operation that is corresponding to the request instruction and executed by the server 20 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a second scenario, a consumption transaction is performed on a subway turnstile on which the verification terminal 10 is installed. During an actual consumption transaction, a consumer displays identity verification information saved in the user terminal 30 to a verification information scan area of the verification terminal 10; and after reading the identity verification information, the verification terminal 10 performs verification communication with the server 20; and after the verification succeeds, the subway turnstile is opened. A verification communication manner between the verification terminal 10 and the server 20 is the same as the manner in the first scenario, which is not described herein again.

In a third scenario, a consumer does the shopping in a shopping mall. During an actual consumption transaction, after selecting an item in a store in which the verification terminal 1020 is installed, the consumer displays identity verification information displayed on the user terminal 30 to a verification information scan area of the verification terminal 10; after reading the identity verification information, the verification terminal 10 performs verification communication with the server 20; and after the verification succeeds, the consumption settlement is completed. A verification communication manner between the verification terminal 10 and the server 20 is also the same as the manner in the first scenario, which is not described herein again.

Figure 2:
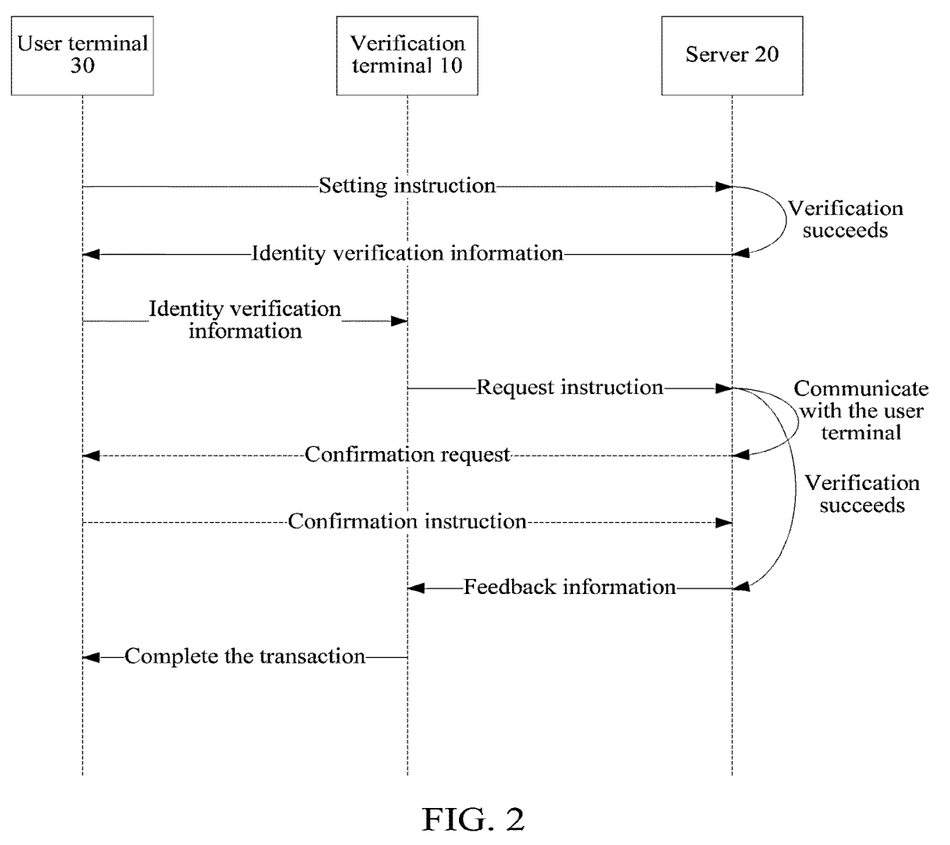
FIG. 2 is an interaction principle diagram of a data interaction system according to an embodiment of the present invention.

FIG. 2 is an interaction principle diagram of a data interaction system according to an embodiment of the present invention. As shown in FIG. 2, after receiving a request instruction, and before executing an operation corresponding to the request instruction, the server 20 may further first determine whether to send a confirmation request to the user terminal 30, which specifically is as follows:

The server 20 determines whether to communicate with the user terminal 30; in a case in which the server 20 determines to communicate with the user terminal 30, sends a confirmation request to the user terminal 30, and receives a confirmation instruction from the user terminal 30 in response to the confirmation request, and in a case in which the server 20 receives the confirmation instruction, the server 20 executes an operation corresponding to the request instruction; or in a case in which the server 20 determines not to communicate with the user terminal 30, the server 20 directly executes an operation corresponding to the request instruction. The operation that is corresponding to the request instruction and executed by the server 20 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a case in which the server 20 receives the request instruction, the server 20 first determines whether to communicate with the user terminal 30; if the server 20 needs to communicate with the user terminal 30, the server 20 sends a confirmation request to the user terminal 30; and after receiving a confirmation instruction from the user terminal 30 in response to the confirmation request, the server 20 executes an operation corresponding to the request instruction, to ensure the security of the transaction process, thereby avoiding the verification terminal 10 from bringing an economic loss to a consumer due to misoperations or other reasons. If the server 20 does not need to communicate with the user terminal 30, it indicates that the server 20 already obtains a confirmation from the user terminal 30 during generation of the identity verification information, where the confirmation indicates that the user terminal 30 does not need to give a confirmation any longer during an actual consumption transaction.

According to this embodiment of the present invention, a method embodiment that may be used to implement an apparatus embodiment of this application is provided. It should be noted that, steps shown in flowcharts of the accompanying drawings may be performed in a computer system including a group of computer executable instructions. Moreover, although a logical sequence is shown in the flowcharts, in some cases, the shown or described steps may be performed in a sequence different from the sequence herein.

Figure 3:
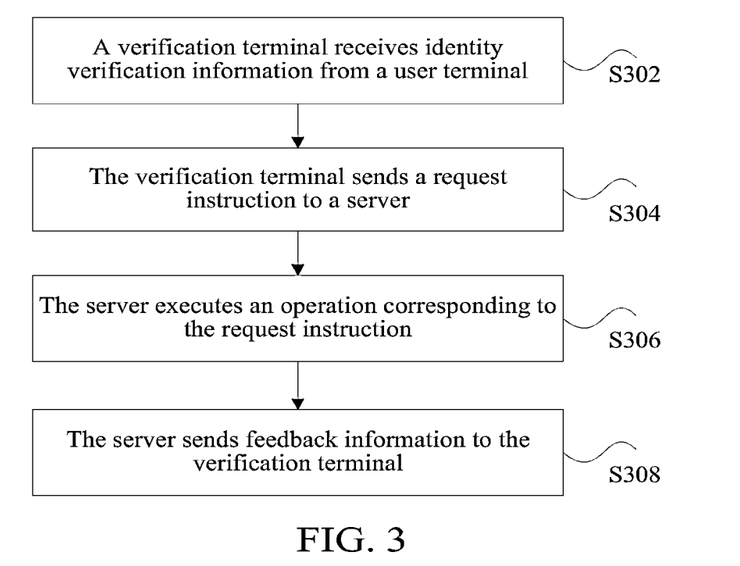
FIG. 3 is a flowchart of a data interaction method according to some embodiments of the present invention.

According to this embodiment of the present invention, a data interaction method is provided, which is mainly executed by using the foregoing data interaction system that constitutes the embodiments of the present invention. FIG. 3 is a flowchart of a data interaction method according to some embodiments of the present invention. As shown in FIG. 3, the method includes step S302 to step S308 as follows:

S302: A verification terminal 10 receives identity verification information from a user terminal 30, where the identity verification information is information sent to the user terminal 30 by a server 20 in advance.

In this embodiment, the identity verification information may be displayed in the form of a two-dimensional code, a bar code, a string, or the like, and the user terminal 30 may be a portable device such as a smart phone or a tablet computer. The verification terminal 10 may be an electronic device such as a two-dimensional code scanner, a bar code scanner, or a string receiver, the user terminal 30 may communicate with the server 20 by using a mobile network or the Internet, and the user terminal 30 may communicate with the verification terminal 10 by using a manner such as a near field communication manner or a scan manner.

S304: The verification terminal 10 sends a request instruction to the server 20, where the request instruction includes identity verification information, and the verification terminal 10 may communicate with the server 20 in a wired and/or a wireless manner.

S306: The server 20 executes an operation corresponding to the request instruction.

S308: The server 20 sends feedback information to the verification terminal 10.

In the data interaction method of this embodiment of the present invention, a verification terminal receives identity verification information from a user terminal, and sends a request instruction including the received identity verification information to a server; and then the server executes a corresponding operation, and sends feedback information to the verification terminal, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction processing manners in the existing technology consume a relatively long time, thereby achieving effects of shortening the time and improving efficiency.

Further, after step S304 that the verification terminal 10 sends a request instruction to the server 20, the data interaction method of this embodiment of the present invention further includes: determining, by the server 20, whether to communicate with the user terminal 30; in a case in which the server 20 determines to communicate with the user terminal 30, sending a confirmation request to the user terminal 30, and receiving a confirmation instruction from the user terminal 30 in response to the confirmation request, and in a case in which the server 20 receives the confirmation instruction, executing an operation corresponding to the request instruction; or in a case in which the server 20 determines not to communicate with the user terminal 30, directly executing an operation corresponding to the request instruction. The operation that is corresponding to the request instruction and executed by the server 20 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a case in which the server 20 receives the request instruction, the server 20 first determines whether to communicate with the user terminal 30; if the server 20 needs to communicate with the user terminal 30, the server 20 sends a confirmation request to the user terminal 30; and after receiving a confirmation instruction from the user terminal 30 in response to the confirmation request, the server 20 executes an operation corresponding to the request instruction, to ensure the security of the transaction process, thereby avoiding the verification terminal 10 from bringing an economic loss to a consumer due to misoperations or other reasons. If the server 20 does not need to communicate with the user terminal 30, it indicates that the server 20 already obtains a confirmation from the user terminal 30 during generation of the identity verification information, where the confirmation indicates that the user terminal 30 does not need to give a confirmation any longer during an actual consumption transaction.

It should be noted that, in this embodiment of the present invention, the identity verification information received by the verification terminal 10 may be information generated by the server 20 according to a setting instruction from the user terminal 30. Specifically, before a consumption transaction, a consumer logs in, by using a registered account number and a password, to an e-commerce platform run by the server 20 on the user terminal 30, after the login succeeds, the user terminal 30 sends the setting instruction to the server 20; and the server 20 generates identity verification information according to the received setting instruction, and returns the generated identity verification information to the user terminal 30.

The setting instruction includes a password and setting information, and before generating the identity verification information according to the setting instruction, the server 20 first determines whether the received password is the same as a preset password. The preset password is a transaction password of an account logged in to the e-commerce platform on the user terminal 30; and the setting information may include, but is not limited to, a preset value (such as 100 yuan) used to represent a maximum payment amount, a valid consumption period of the maximum payment amount, where the period of validity may be indicated by a setting duration and a preset duration (such as 12 hours), information indicating whether the server 20 needs to feed back a consumption confirmation request in a consumption process, and the like. In a case in which the server 20 determines that the received password is the same as the preset password, the server 20 generates the identity verification information by using the setting information.

Figure 4:
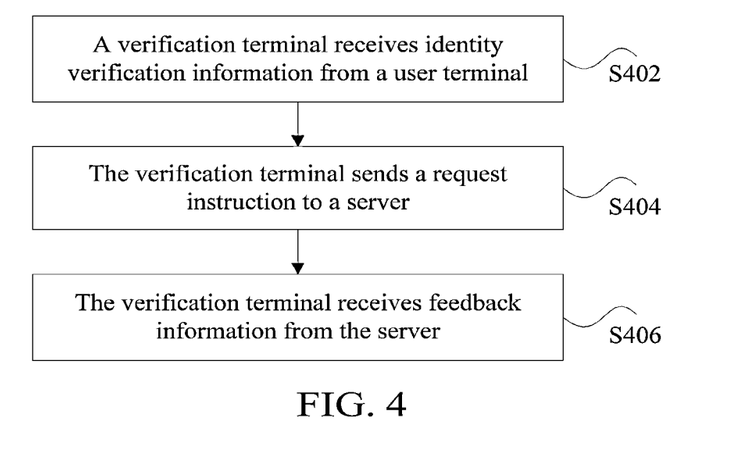
FIG. 4 is a flowchart of a data interaction method according to a some embodiments of the present invention.

FIG. 4 is a flowchart of a data interaction method according to some embodiments of the present invention. As shown in FIG. 4, the method includes step S402 to step S406 as follows:

S402: A verification terminal 10 receives identity verification information from a user terminal 30, where the identity verification information is information sent to the user terminal 30 by a server 20 in advance.

In this embodiment, the identity verification information may be displayed in the form of a two-dimensional code, a bar code, a string, or the like, and the user terminal 30 may be a portable device such as a smart phone or a tablet computer. The verification terminal 10 may be a device such as a two-dimensional code scanner, a bar code scanner, or a string receiver, the user terminal 30 may communicate with the server 20 by using a mobile network or the Internet, and the user terminal 30 may communicate with the verification terminal 10 by using a manner such as a near field communication manner or a scan manner.

S404: The verification terminal 10 sends a request instruction to the server 20, where the request instruction includes identity verification information, and the verification terminal 10 may communicate with the server 20 in a wired and/or a wireless manner.

S406: The verification terminal 10 receives feedback information from the server 20, where the feedback information is information sent by the server 20 to the verification terminal 10 after executing an operation corresponding to the request instruction.

In the data interaction method of this embodiment of the present invention, a verification terminal receives identity verification information from a user terminal, and sends a request instruction including the received identity verification information to a server; and then the server executes a corresponding operation, and sends feedback information to the verification terminal, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction processing manners in the existing technology consume a relatively long time, thereby achieving effects of shortening the time and improving efficiency.

Further, after step S404 that the verification terminal 10 sends a request instruction to the server 20, the data interaction method provided by the some embodiments of the present invention further includes: determining, by the server 20, whether to communicate with the user terminal 30; in a case in which the server 20 determines to communicate with the user terminal 30, sending a confirmation request to the user terminal 30, and receiving a confirmation instruction from the user terminal 30 in response to the confirmation request, and in a case in which the server 20 receives the confirmation instruction, executing an operation corresponding to the request instruction; or in a case in which the server 20 determines not to communicate with the user terminal 30, directly executing an operation corresponding to the request instruction. The operation that is corresponding to the request instruction and executed by the server 20 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a case in which the server 20 receives the request instruction, the server 20 first determines whether to communicate with the user terminal 30; if the server 20 needs to communicate with the user terminal 30, the server 20 sends a confirmation request to the user terminal 30; and after receiving a confirmation instruction from the user terminal 30 in response to the confirmation request, the server 20 executes an operation corresponding to the request instruction, to ensure the security of the transaction process, thereby avoiding the verification terminal 10 from bringing an economic loss to a consumer due to misoperations or other reasons. If the server 20 does not need to communicate with the user terminal 30, it indicates that the server 20 already obtains a confirmation from the user terminal 30 during generation of the identity verification information, where the confirmation indicates that the user terminal 30 does not need to give a confirmation any longer during an actual consumption transaction.

It should be noted that, in this embodiment of the present invention, the identity verification information received by the verification terminal 10 may be information generated by the server 20 according to a setting instruction from the user terminal 30. Specifically, before a consumption transaction, a consumer logs in, by using a registered account number and a password, to an e-commerce platform run by the server 20 on the user terminal 30, after the login succeeds, the user terminal 30 sends the setting instruction to the server 20, and the server 20 generates identity verification information according to the received setting instruction, and returns the generated identity verification information to the user terminal 30.

The setting instruction includes a password and setting information, and before generating the identity verification information according to the setting instruction, the server 20 first determines whether the received password is the same as a preset password. The preset password is a transaction password of an account logged in to the e-commerce platform on the user terminal 30; and the setting information may include, but is not limited to, a preset value (such as 100 yuan) used to represent a maximum payment amount, a valid consumption period of the maximum payment amount, where the period of validity may be indicated by a setting duration and a preset duration (such as 12 hours), information indicating whether the server 20 needs to feed back a consumption confirmation request in a consumption process, and the like. In a case in which the server 20 determines that the received password is the same as the preset password, the server 20 generates the identity verification information by using the setting information.

Figure 5:
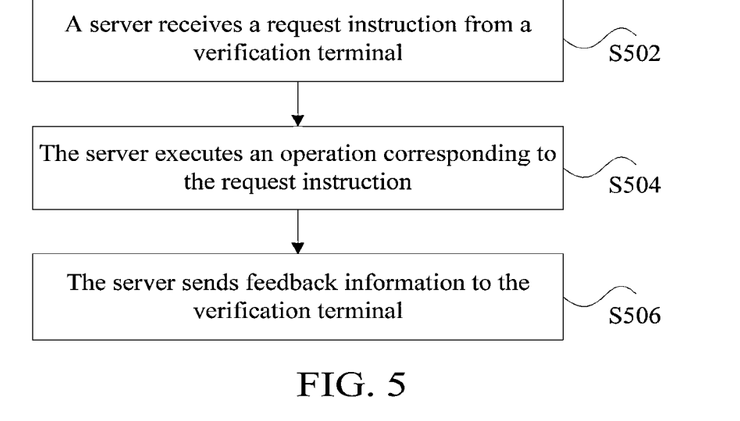
FIG. 5 is a flowchart of a data interaction method according to a some embodiments of the present invention.

FIG. 5 is a flowchart of a data interaction method according to some embodiments of the present invention. The data interaction method is mainly executed by the server 20 of the foregoing data interaction system that constitutes the embodiments of the present invention. As shown in FIG. 5, the method includes step S502 to step S506 as follows:

S502: A server 20 receives a request instruction from a verification terminal 10, where the request instruction includes identity verification information received from a user terminal 30 by the verification terminal 10, and the identity verification information is information sent to the user terminal 30 by the server 20 in advance.

In this embodiment, the identity verification information may be displayed in the form of a two-dimensional code, a bar code, a string, or the like, and the user terminal 30 may be a portable device such as a smart phone or a tablet computer. The verification terminal 10 may be a device such as a two-dimensional code scanner, a bar code scanner, or a string receiver, the user terminal 30 may communicate with the server 20 by using a mobile network or the Internet, the user terminal 30 may communicate with the verification terminal 10 by using a manner such as a near field communication manner or a scan manner, and the verification terminal 10 may communicate with the server 20 in a wired and/or a wireless manner.

S504: The server 20 executes an operation corresponding to the request instruction.

S506: The server 20 sends feedback information to the verification terminal 10.

In the data interaction method of this embodiment of the present invention, a verification terminal receives identity verification information from a user terminal, and sends a request instruction including the received identity verification information to a server; and then the server executes a corresponding operation, and sends feedback information to the verification terminal, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction processing manners in the existing technology consume a relatively long time, thereby achieving effects of shortening the time and improving efficiency.

Further, after the server 20 receives the request instruction from the verification terminal 10, the data interaction method provided by the some embodiments further includes: determining, by the server 20, whether to communicate with the user terminal 30; in a case in which the server 20 determines to communicate with the user terminal 30, sending a confirmation request to the user terminal 30; and receiving, by the server 20, a confirmation instruction from the user terminal 30 in response to the confirmation request. In a case in which the server 20 determines not to communicate with the user terminal 30, or in a case in which the server 20 receives the confirmation instruction, the server 20 executes an operation corresponding to the request instruction. The operation that is corresponding to the request instruction and executed by the server 20 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a case in which the server 20 receives the request instruction, the server 20 first determines whether to communicate with the user terminal 30; if the server 20 needs to communicate with the user terminal 30, the server 20 sends a confirmation request to the user terminal 30; and after receiving a confirmation instruction from the user terminal 30 in response to the confirmation request, the server 20 executes an operation corresponding to the request instruction, to ensure the security of the transaction process, thereby avoiding the verification terminal 10 from bringing an economic loss to a consumer due to misoperations or other reasons. If the server 20 does not need to communicate with the user terminal 30, it indicates that the server 20 already obtains a confirmation from the user terminal 30 during generation of the identity verification information, where the confirmation indicates that the user terminal 30 does not need to give a confirmation any longer during an actual consumption transaction.

Specifically, in this embodiment of the present invention, the server 20 may determine whether to communicate with the user terminal 30 by using the following manners:

S1: The server 20 acquires an identification value in the identity verification information, where the identification value may be a state flag bit in the identity verification information, for example, the identification value may be 1 or 0.

S2: The server 20 determines whether the acquired identification value is a first preset identification value or a second preset identification value, and as an exemplary example, the first preset identification value may be 1, and the second preset identification value may be 0.

S3: Determine, in a case in which the server 20 determines that the acquired identification value is the first preset identification value, to communicate with the user terminal 30, and determine, in a case in which the server 20 determines that the acquired identification value is the second preset identification value, not to communicate with the user terminal 30. If the acquired identification value is 1, that is, it is determined that the acquired identification value is the first preset identification value, the server 20 determines to communicate with the user terminal 30; and if the acquired identification value is 0, that is, it is determined that the acquired identification value is the second preset identification value, the server 20 determines not to communicate with the user terminal 30.

Further, after receiving the request instruction from the verification terminal 10, the server 20 may first authenticate the identity verification information in the request instruction, where the authentication mainly is authenticating whether an account corresponding to the identity verification information is one account of registered accounts stored in the server 20, that is, authenticating validity of the identity verification information, to achieve an effect of improving security of the transaction process. In a case in which authentication of the identity verification information succeeds, the server 20 determines whether to communicate with the user terminal 30.

It should be noted that, in this embodiment of the present invention, the identity verification information sent to the user terminal 30 by the server 20 in advance may be information generated by the server 20 according to a setting instruction from the user terminal 30. Specifically, before a consumption transaction, a consumer logs in, by using a registered account number and a password, to an e-commerce platform run by the server 20 on the user terminal 30, after the login succeeds, the user terminal 30 sends the setting instruction to the server 20, and the server 20 generates identity verification information according to the received setting instruction, and returns the generated identity verification information to the user terminal 30.

The setting instruction includes a password and setting information, and before generating the identity verification information according to the setting instruction, the server 20 first determines whether the received password is the same as a preset password. The preset password is a transaction password of an account logged in to the e-commerce platform on the user terminal 30; and the setting information may include, but is not limited to, a preset value (such as 100 yuan) used to represent a maximum payment amount, a valid consumption period of the maximum payment amount, where the period of validity may be indicated by a setting duration and a preset duration (such as 12 hours), information indicating whether the server 20 needs to feed back a consumption confirmation request in a consumption process, and the like. In a case in which the server 20 determines that the received password is the same as the preset password, the server 20 generates the identity verification information by using the setting information.

Further, the request instruction sent to the server 20 by the verification terminal 10 further includes a target value, where the target value is an actual consumption transaction amount, while the setting information includes a preset value of a certain amount set by the consumer by using the user terminal 30. Correspondingly, the generated identity verification information also includes the preset value. After the server 20 receives the request instruction from the verification terminal 10, and before the server 20 executes an operation corresponding to the request instruction, the data interaction method of this embodiment of the present invention further includes: determining, by the server 20, whether the target value is greater than the preset value. In a case in which the server 20 determines that the target value is less than or equal to the preset value, the server 20 executes an operation corresponding to the request instruction, that is, in a case in which the server 20 determines that the actual consumption transaction amount does not exceed a preset amount, the server 20 deducts a corresponding consumption amount from an account corresponding to the identity verification information, and adds the same consumption amount to an account corresponding to the verification terminal 10, or directly transfers a corresponding consumption amount to an account corresponding to the verification terminal 10 from an account corresponding to the identity verification information.

Further, the setting information further includes a valid consumption period of the preset value, and the valid consumption period may be a preset duration. Correspondingly, the generated identity verification information also includes the preset duration. After the server 20 receives the request instruction from the verification terminal 10, and before the server 20 executes an operation corresponding to the request instruction, the data interaction method of this embodiment of the present invention further includes: determining, by the server 20, whether time at which the request instruction is received is within a preset duration. In a case in which the server 20 determines that the time at which the request instruction is received is within the preset duration, the server 20 executes an operation corresponding to the request instruction, that is, in a case in which the server 20 determines that the time at which the request instruction is received does not exceed a valid consumption period set by a consumer, the server 20 deducts a corresponding consumption amount from an account corresponding to the identity verification information, and adds the same consumption amount to an account corresponding to the verification terminal 10, or directly transfers a corresponding consumption amount to an account corresponding to the verification terminal 10 from an account corresponding to the identity verification information.

The determining whether the a target value is greater than preset data and the determining whether the receiving time is within a preset duration both aim to ensure security of the transaction process, so that the transaction security is ensured on the basis of shortening the time and improving efficiency.

It should be noted that, for the methods according to the embodiments, for purposes of simplicity of explanation, the methods are described as a combination of a series of actions, but it should be clear to persons skilled in the art that the present disclosure is not limited by the order of the actions, as some steps can, in accordance with the present disclosure, be performed in other orders or concurrently. Next, persons skilled in the art should also know that, the embodiments described in the specification all fall within exemplary embodiments, and the related actions and modules are not necessarily required by the present disclosure.

Through the foregoing description of the implementation manners, it is clear to persons skilled in the art that the present disclosure may be accomplished through software plus a necessary hardware platform, or completely through hardware, but in many cases the former is a preferred implementation manner. Based on this, the technical solution of the present disclosure or the part that makes contributions to the existing technology can be embodied in the form of a software product. The computer software product may be stored in a storage medium (such as a ROM/RAM, a magnetic disk or an optical disc), and contain several instructions to instruct computer equipment (for example, a mobile phone, a personal computer, a server, or network equipment) to perform the method described in the embodiments of the present invention.

Figure 6:
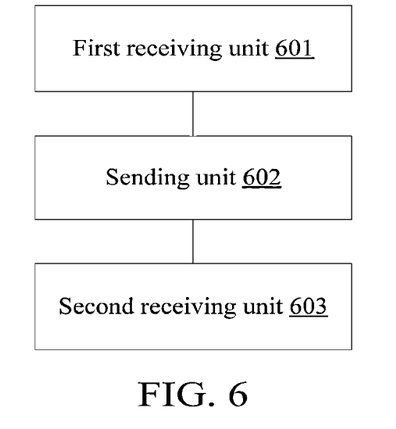
FIG. 6 is a schematic diagram of a verification terminal according to an embodiment of the present invention.

According to this embodiment of the present invention, a verification terminal 10 for implementing the data interaction method in the some embodiments is further provided, and the verification terminal 10 provided by this embodiment of the present invention is specifically described as follows:

FIG. 6 is a schematic diagram of a verification terminal 10 according to an embodiment of the present invention. As shown in FIG. 6, the verification terminal 10 is a verification terminal 10 of the foregoing data interaction system that constitutes the embodiments of the present invention, and includes one or more processors, a memory, and one or more program units. The one or more program units are stored in the memory, and executed by the one or more processors, to perform the data interaction method. In the embodiment, the one or more program units may include a first receiving unit 601, a sending unit 602, and a second receiving unit 603.

The first receiving unit 601 is configured to receive identity verification information from a user terminal 30, where the identity verification information is information sent to the user terminal 30 by a server 20 in advance.

In this embodiment, the identity verification information may be displayed in the form of a two-dimensional code, a bar code, a string, or the like, and the user terminal 30 may be a portable device such as a smart phone or a tablet computer. The verification terminal 10 may be a device such as a two-dimensional code scanner, a bar code scanner, or a string receiver, the user terminal 30 may communicate with the server 20 by using a mobile network or the Internet, and the user terminal 30 may communicate with the verification terminal 10 by using a manner such as a near field communication manner or a scan manner.

The sending unit 602 is configured to send a request instruction to the server 20, where the request instruction includes the identity verification information, and the verification terminal 10 may communicate with the server 20 in a wired and/or a wireless manner.

The second receiving unit 603 is configured to receive feedback information from the server 20, where the feedback information is information sent by the server 20 to the verification terminal 10 after executing an operation corresponding to the request instruction.

In the verification terminal of this embodiment of the present invention, the first receiving unit 601 receives identity verification information from a user terminal, the sending unit 602 sends a request instruction including the received identity verification information to a server, and then the server executes a corresponding operation, and the second receiving unit 603 receives feedback information sent by the server, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after receiving the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction processing manners in the existing technology consume a relatively long time, thereby achieving effects of shortening the time and improving efficiency.

The identity verification information is information generated by the server 20 according to a setting instruction from the user terminal 30. Specifically, before a consumption transaction, a consumer logs in, by using a registered account number and a password, to an e-commerce platform run by the server 20 on the user terminal 30, after the login succeeds, the user terminal 30 sends the setting instruction to the server 20, and the server 20 generates identity verification information according to the received setting instruction, and returns the generated identity verification information to the user terminal 30.

Figure 7:
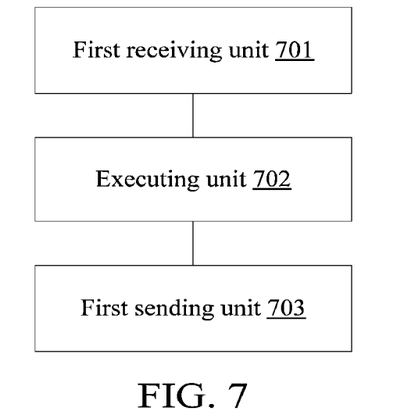
FIG. 7 is a schematic diagram of a server according to an embodiment of the present invention.

According to this embodiment of the present invention, a server 20 for implementing the data interaction method in the some embodiments is further provided, and the server 20 provided by this embodiment of the present invention is specifically introduced as follows:

FIG. 7 is a schematic diagram of a server 20 according to an embodiment of the present invention. As shown in FIG. 7, the server 20 is a server 20 of the foregoing data interaction system that constitutes the embodiments of the present invention, and includes one or more processors, a memory, and one or more program units. The one or more program units are stored in the memory, and executed by the one or more processors, to perform the data interaction method. In the embodiment, the one or more program units may include a first receiving unit 701, an executing unit 702, and a first sending unit 703.

The first receiving unit 701 is configured to receive a request instruction from a verification terminal 10, where the request instruction includes identity verification information received from a user terminal 30 by the verification terminal 10, and the identity verification information is information sent to the user terminal 30 by the server 20 in advance.

In this embodiment, the identity verification information may be displayed in the form of a two-dimensional code, a bar code, a string, or the like, and the user terminal 30 may be a portable device such as a smart phone or a tablet computer. The verification terminal 10 may be a device such as a two-dimensional code scanner, a bar code scanner, or a string receiver, the user terminal 30 may communicate with the server 20 by using a mobile network or the Internet, the user terminal 30 may communicate with the verification terminal 10 by using a manner such as a near field communication manner or a scan manner, and the verification terminal 10 may communicate with the server 20 in a wired and/or a wireless manner.

The executing unit 702 is configured to execute an operation corresponding to the request instruction.

The first sending unit 703 is configured to send feedback information to the verification terminal 10.

In the server of this embodiment of the present invention, a verification terminal receives identity verification information from a user terminal, and sends a request instruction including the received identity verification information to a first receiving unit 701, then an executing unit 702 executes a corresponding operation, and a first sending unit 703 sends feedback information to the verification terminal, so that in a transaction process, the user terminal only needs to show, to the verification terminal, the identity verification information that represents a user terminal identity and is received in advance. Compared with the consumption manner in the existing technology that the user terminal receives a verification code from the verification terminal, the present disclosure does not require the user terminal to manually input or scan the verification code, which shortens the transaction time; in addition, after the first receiving unit 701 receives the request instruction including the identity verification information, the server can execute the corresponding operation without the need of receiving and verifying a transaction password input by the user terminal, which further shortens the transaction time compared with the manner in the existing technology that a user needs to input the transaction password for each transaction. Further, the data interaction manner provided by this embodiment of the present invention is initiated when the user performs real-time consumption, and compared with the manner in the existing technology that the user needs to first perform an on-line payment and then conduct an off-line transaction, the manner provided by the present disclosure implements synchronization of an on-line payment and an off-line transaction, and further shortens the transaction time. Therefore, this embodiment of the present invention solves the problem that the data interaction processing manners in the existing technology consume a relatively long time, thereby achieving effects of shortening the time and improving efficiency.

Further, the one or more program units of the server 20 further include a first determining unit, a second sending unit, and a second receiving unit, and after the first receiving unit 701 receives the request instruction from the verification terminal 10, the first determining unit determines whether to communicate with the user terminal 30. In a case in which the first determining unit determines to communicate with the user terminal 30, the second sending unit sends a confirmation request to the user terminal 30, and the second receiving unit receives a confirmation instruction from the user terminal 30 in response to the confirmation request. The executing unit 702 is configured to execute, in a case in which the first determining unit determines not to communicate with the user terminal 30, or in a case in which the second receiving unit receives the confirmation instruction, an operation corresponding to the request instruction. The operation that is corresponding to the request instruction and executed by executing unit 702 may be deducting a corresponding consumption amount from an account corresponding to the identity verification information, and adding the same consumption amount to an account corresponding to the verification terminal 10, or may be directly transferring a corresponding consumption amount to an account corresponding to the verification terminal 10 from an account corresponding to the identity verification information.

In a case in which the server 20 receives the request instruction, the server 20 first determines whether to communicate with the user terminal 30; if the server 20 needs to communicate with the user terminal 30, the server 20 sends a confirmation request to the user terminal 30; and after receiving a confirmation instruction from the user terminal 30 in response to the confirmation request, the server 20 executes an operation corresponding to the request instruction, to ensure the security of the transaction process, thereby avoiding the verification terminal 10 from bringing an economic loss to a consumer due to misoperations or other reasons. If the server 20 does not need to communicate with the user terminal 30, it indicates that the server 20 already obtains a confirmation from the user terminal 30 during generation of the identity verification information, where the confirmation indicates that the user terminal 30 does not need to give a confirmation any longer during an actual consumption transaction.

Specifically, the first determining unit mainly includes an acquiring module, a determining module, a first determining module, and a second determining module.

The acquiring module is configured to acquire an identification value in the identity verification information, where the identification value may be a state flag bit in the identity verification information, for example, the identification value may be 1 or 0.

The determining module is configured to determine whether the acquired identification value is a first preset identification value or a second preset identification value, and as an exemplary example, the first preset identification value may be 1, and the second preset identification value may be 0.

The first determining module is configured to determine, in a case in which the determining module determines that the acquired identification value is the first preset identification value, to communicate with the user terminal 30, and determine, if the acquired identification value is 1, that is, it is determined that the acquired identification value is the first preset identification value, to communicate with the user terminal 30.

The second determining module is configured to determine, in a case in which the determining module determines that the acquired identification value is the second preset identification value, not to communicate with the user terminal 30, and determine, if the acquired identification value is 0, that is, it is determined that the acquired identification value is the second preset identification value, not to communicate with the user terminal 30.

Further, the server 20 further includes an authentication unit, and before the first determining unit determines whether to communicate with the user terminal 30, the authentication unit first authenticates the identity verification information in the request instruction, which mainly is authenticating whether an account corresponding to the identity verification information is one account of registered accounts stored in the server 20, that is, authenticating validity of the identity verification information, to achieve an effect of improving the security of the transaction process. In a case in which authentication of the identity verification information succeeds, the first determining unit determines whether to communicate with the user terminal 30.

Further, the server 20 provided by this embodiment of the present invention further includes a third receiving unit, a generating unit, and a third sending unit. The server 20 generates identity verification information with the cooperation of the third receiving unit, the generating unit, and the third sending unit. Specifically, before a consumption transaction, a consumer logs in to an e-commerce platform on the user terminal 30 by using a registered account number and a password, and after login, the user terminal 30 sends a setting instruction to the server 20. The third receiving unit is configured to receive the setting instruction from the user terminal 30, the generating unit is configured to generate the identity verification information according to the setting instruction, and the third sending unit is configured to send the identity verification information to the user terminal 30.

The setting instruction includes a password and setting information, and the server 20 further includes a second determining unit. before the generating unit generates the identity verification information according to the setting instruction, the second determining unit is configured to determine whether the password in the setting instruction is the same as a preset password. The preset password is a transaction password of an account logged in to the e-commerce platform on the user terminal 30; and the setting information may include, but is not limited to, a preset value (such as 100 yuan) used to represent a maximum payment amount, a valid consumption period of the maximum payment amount, where the period of validity may be indicated by a setting duration and a preset duration (such as 12 hours), information indicating whether the server 20 needs to feed back a consumption confirmation request in a consumption process, and the like. In a case in which the second determining unit determines that the received password is the same as the preset password, the generating unit generates the identity verification information by using the setting information.

Further, the request instruction received by the first receiving unit 701 further includes a target value, where the target value is an actual consumption transaction amount, while the setting information includes a preset value of a certain amount set by the consumer by using the user terminal 30. Correspondingly, the generated identity verification information also includes the preset value. The server 20 further includes a third determining unit, and after the first receiving unit 701 receives the request instruction from the verification terminal 10, the third determining unit determines whether the target value is greater than the preset value. In a case in which the third determining unit determines that the target value is less than or equal to the preset value, the executing unit 702 executes an operation corresponding to the request instruction. That is, in a case in which the third determining unit determines that the actual consumption transaction amount does not exceed a preset amount, the executing unit 702 deducts a corresponding consumption amount from an account corresponding to the identity verification information, and adds the same consumption amount to an account corresponding to the verification terminal 10, or directly transfers a corresponding consumption amount to an account corresponding to the verification terminal 10 from an account corresponding to the identity verification information.

Further, the setting information further includes a valid consumption period of the preset value, and the valid consumption period may be a preset duration. Correspondingly, the generated identity verification information also includes the preset duration. The server 20 further includes a fourth determining unit, and after the first receiving unit 701 receives the request instruction from the verification terminal 10, the fourth determining unit determines whether time at which the request instruction is received is within the preset duration. In a case in which the fourth determining unit determines that the time at which the request instruction is received is within the preset duration, the executing unit 702 executes an operation corresponding to the request instruction, that is, in a case in which the fourth determining unit determines that the time at which the request instruction is received does not exceed a valid consumption period set by a consumer, the executing unit 702 deducts a corresponding consumption amount from an account corresponding to the identity verification information, and adds the same consumption amount to an account corresponding to the verification terminal 10, or directly transfers a corresponding consumption amount to an account corresponding to the verification terminal 10 from an account corresponding to the identity verification information.

The determining by the third determining unit whether the a target value is greater than preset data and the determining by the fourth determining unit whether the receiving time is within a preset duration both aim to ensure security of the transaction process, so that the transaction security is ensured on the basis of shortening the time and improving efficiency.

It can be seen from the foregoing descriptions that, the present disclosure solves the problem that the data interaction manners in the existing technology consume a relatively long time, thereby achieving effects of shortening the time and improving efficiency.

The sequence numbers of the foregoing embodiments of the present invention are merely for the convenience of description, and do not imply the preference among the embodiments.

In the foregoing embodiments of the present invention, description for the embodiments has its own emphasis, and reference may be made to relevant description in other embodiments for a part without being described in detail in a certain embodiment.

In the several embodiments provided in the present application, it should be understood that the disclosed verification terminal may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the shown or discussed mutual couplings or direct coupling or communication connection may be accomplished through some interfaces. The indirect coupling or communication connection between the units or modules may be electrical or in other forms.

Units described as separate components may be or may not be physically separated. Components shown as units may be or may not be physical units, that is, may be integrated or distributed to a plurality of network units. Some or all of the units may be selected to achieve the objectives of the solution of the embodiment according to actual needs.

In addition, functional units in the embodiments of the present invention may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as a separate product, the integrated unit may be stored in a computer-readable storage medium. Therefore, the technical solution of the present disclosure or the part that makes contributions to the existing technology can be substantially embodied in the form of a software product. The computer software product is stored in a storage medium, and contains several instructions to instruct computer equipment (such as, a personal computer, a server, or network equipment) to perform all or part of steps of the method as described in the embodiments of the present invention. The storage medium includes various media capable of storing program code, such as, a flash disk, a Read-Only Memory (ROM), a Random Access Memory (RAM), a mobile hard disk, a magnetic disk or an optical disc.

The foregoing descriptions are merely preferred implementation manners of the present disclosure. It should be noted that, a person of ordinary skill in the art may further make improvements and modifications without departing from the principle of the present disclosure, and the improvements and modifications should also be regarded as the protection scope of the present disclosure.

The invention claimed is:

1. A data interaction method, comprising:
receiving, by a server, a pre-authorization request along with an account number and a password from a user terminal;
processing, by the server, the account number and the password according to the pre-authorization request; and
pre-authorizing, by the server, identity verification information according to the account number and the password as processed, the identity verification information including information on a valid consumption period;
sending, by the server, the identity verification information to the user terminal, the identity verification information being obtained by a verification terminal from the user terminal;
receiving, by the server, a request instruction from the verification terminal, the request instruction including the identity verification information of the user terminal;
in response to receiving the request instruction, sending, by the server, a confirmation request directly to the user terminal, bypassing the verification terminal, wherein sending the confirmation request further comprises:
determining, by the server, whether a time at which the request instruction is received is outside of the valid consumption period;
in response to determining the time at which the request instruction is received is outside of the valid consumption period, sending, by the server, a confirmation request to the user terminal; and
receiving, by the server, a confirmation instruction from the user terminal as a reply to the confirmation request;
in response to receiving from the user terminal the confirmation instruction, executing an operation corresponding to the request instruction and sending, by the server, feedback information to the verification terminal, the feedback information including a decision on validity confirmation of the identity verification information.

2. The method of claim 1, wherein the identity verification information upon being displayed on the user terminal includes a scannable code, the verification terminal includes a scanner configured to scan the scannable code of the identity verification information, and the method further comprises:
receiving, by the server, the request instruction from the verification terminal in response to determining the scannable code of the identity verification information of the user terminal having been scanned by the verification terminal.

3. The method of claim 1, prior to receiving the request instruction from the verification terminal, the method further comprising:
determining, by the server, whether the password as submitted by the user is the same as a preset password; and
generating, by the server, the identity verification information in response to determining the password as submitted by the user is the same as the preset password.

4. The method of claim 1, further comprising:
acquiring, by the server, an identification value in the identity verification information;
determining, by the server, whether the identification value is a first preset identification value or a second preset identification value different than the first preset identification value; and
in response to determining the identification is the first preset identification value but not the second preset identification value, determining, by the server, to communicate with the user terminal.

5. The method of claim 1, further comprising:
authenticating, by the server, the identity verification information prior to sending the confirmation request from the user terminal.

6. A data interaction server, comprising: a memory storing computer program instructions; and a processor coupled to the memory and configured to execute the computer program instructions and perform:
  receiving a pre-authorization request along with an account number and a password from a user terminal;
  processing the account number and the password according to the pre-authorization request; and
  pre-authorizing identity verification information according to the account number and the password as processed, the identity verification information including information on a valid consumption period;
  sending the identity verification information to the user terminal, the identity verification information being obtained by a verification terminal from the user terminal;
  receiving a request instruction from the verification terminal, the request instruction including the identity verification information of the user terminal;
  in response to receiving the request instruction, sending a confirmation request directly to the user terminal, bypassing the verification terminal, wherein sending the confirmation request further comprises:
    determining whether a time at which the request instruction is received is outside of the valid consumption period;
    in response to determining the time at which the request instruction is received is outside of the valid consumption period, sending a confirmation request to the user terminal; and
    receiving a confirmation instruction from the user terminal as a reply to the confirmation request;
  in response to receiving from the user terminal the confirmation instruction, executing an operation corresponding to the request instruction and sending feedback information to the verification terminal, the feedback information including a decision on validity confirmation of the identity verification information.

7. The data interaction server of claim 6, wherein the identity verification information upon being displayed on the user terminal includes a scannable code, the verification terminal includes a scanner configured to scan the scannable code of the identity verification information, and wherein the processor is further configured to execute the computer program instructions and perform:
  receiving the request instruction from the verification terminal in response to determining the scannable code of the identity verification information of the user terminal having been scanned by the verification terminal.

8. The data interaction server of claim 6, wherein the processor is further configured to execute the computer program instructions and perform:
  prior to receiving the request instruction from the verification terminal, determining whether the password as submitted by the user is the same as a preset password; and
  generating the identity verification information in response to determining the password as submitted by the user is the same as the preset password.

9. The data interaction server of claim 6, wherein the processor is further configured to execute the computer program instructions and perform:
  acquiring an identification value in the identity verification information;
  determining whether the identification value is a first preset identification value or a second preset identification value different than the first preset identification value; and
  in response to determining the identification is the first preset identification value but not the second preset identification value, determining to communicate with the user terminal.

10. The data interaction server of claim 6, wherein the processor is further configured to execute the computer program instructions and perform:
  authenticating the identity verification information prior to sending the confirmation request from the user terminal.

11. A non-transitory computer-readable storage medium storing computer program instructions executable by at least one processor to perform:
  receiving a pre-authorization request along with an account number and a password from a user terminal;
  processing the account number and the password according to the pre-authorization request; and
  pre-authorizing identity verification information according to the account number and the password as processed, the identity verification information including information on a valid consumption period;
  sending the identity verification information to the user terminal, the identity verification information being obtained by a verification terminal from the user terminal;
  receiving a request instruction from the verification terminal, the request instruction including the identity verification information of the user terminal;
  in response to receiving the request instruction, sending a confirmation request directly to the user terminal, bypassing the verification terminal, wherein sending the confirmation request further comprises:
    determining whether a time at which the request instruction is received is outside of the valid consumption period;
    in response to determining the time at which the request instruction is received is outside of the valid consumption period, sending a confirmation request to the user terminal; and
    receiving a confirmation instruction from the user terminal as a reply to the confirmation request;
  in response to receiving from the user terminal the confirmation instruction, executing an operation corresponding to the request instruction and sending feedback information to the verification terminal, the feedback information including a decision on validity confirmation of the identity verification information.

12. The non-transitory computer-readable storage medium of claim 11, wherein the identity verification information upon being displayed on the user terminal includes a scannable code, the verification terminal includes a scanner configured to scan the scannable code of the identity verification information, and wherein the computer program instructions are executable by the at least one processor to further perform:
  receiving the request instruction from the verification terminal in response to determining the scannable code of the identity verification information of the user terminal having been scanned by the verification terminal.

13. The non-transitory computer-readable storage medium of claim 11, wherein the computer program instructions are executable by the at least one processor to further perform:

prior to receiving the request instruction from the verification terminal, determining whether the password as submitted by the user is the same as a preset password; and generating the identity verification information in response to determining the password as submitted by the user is the same as the preset password.

14. The non-transitory computer-readable storage medium of claim 11, wherein the computer program instructions are executable by the at least one processor to further perform:

acquiring an identification value in the identity verification information;

determining whether the identification value is a first preset identification value or a second preset identification value different than the first preset identification value; and in response to determining the identification is the first preset identification value but not the second preset identification value, determining to communicate with the user terminal.

15. The non-transitory computer-readable storage medium of claim 11, wherein the computer program instructions are executable by the at least one processor to further perform:

authenticating the identity verification information prior to sending the confirmation request from the user terminal.

16. The method of claim 1, wherein when the time at which the request instruction is received is within the valid consumption period, the operation corresponding to the request instruction is executed without sending the confirmation request.

17. The data interaction server of claim 6, wherein when the time at which the request instruction is received is within the valid consumption period, the operation corresponding to the request instruction is executed without sending the confirmation request.

* * * * *